US008102797B2

(12) United States Patent
Abel

(10) Patent No.: US 8,102,797 B2
(45) Date of Patent: Jan. 24, 2012

(54) WEB FORMAT-BASED WIRELESS COMMUNICATIONS

(75) Inventor: Miller T. Abel, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 817 days.

(21) Appl. No.: 11/465,328

(22) Filed: Aug. 17, 2006

(65) Prior Publication Data

US 2008/0046570 A1   Feb. 21, 2008

(51) Int. Cl.
*H04W 4/00* (2009.01)
*H04B 5/02* (2006.01)
*H04B 7/00* (2006.01)

(52) U.S. Cl. ....... 370/328; 455/41.1; 455/41.2; 455/517

(58) Field of Classification Search ........ 455/41.1–41.3, 455/39, 517
See application file for complete search history.

(56) References Cited

U.S. PATENT DOCUMENTS

| | | | |
|---|---|---|---|
| 6,336,142 B1 | 1/2002 | Kato et al. | |
| 6,421,717 B1 | 7/2002 | Kloba et al. | |
| 2003/0013413 A1* | 1/2003 | Berkema et al. | 455/41 |
| 2004/0176032 A1 | 9/2004 | Kotola et al. | |
| 2004/0203381 A1 | 10/2004 | Cahn et al. | |
| 2005/0064814 A1 | 3/2005 | Matsuo et al. | |
| 2005/0198029 A1 | 9/2005 | Pohja et al. | |
| 2006/0052055 A1 | 3/2006 | Rowse et al. | |
| 2006/0069814 A1 | 3/2006 | Abraham et al. | |
| 2006/0094356 A1 | 5/2006 | Dawidowsky | |
| 2006/0183462 A1* | 8/2006 | Kolehmainen | 455/41.2 |
| 2006/0206582 A1* | 9/2006 | Finn | 709/217 |
| 2006/0258289 A1* | 11/2006 | Dua | 455/41.3 |
| 2007/0067303 A1* | 3/2007 | Linjama et al. | 707/10 |
| 2007/0276921 A1* | 11/2007 | Riggs et al. | 709/217 |
| 2008/0207128 A1* | 8/2008 | Mikko | 455/41.2 |
| 2008/0288958 A1* | 11/2008 | Ryoo et al. | 719/313 |
| 2009/0098825 A1* | 4/2009 | Huomo et al. | 455/41.1 |

FOREIGN PATENT DOCUMENTS

| | | |
|---|---|---|
| WO | 2004110017 A1 | 12/2004 |
| WO | 2006011121 A1 | 2/2006 |
| WO | 2006027725 A1 | 3/2006 |

OTHER PUBLICATIONS

International Search Report for International Patent Application No. PCT/US2007/017417 dated Feb. 5, 2008, 3 pages.
Sixto Ortiz, Jr., "Is Near-Field Communication Close to Success?", Computer, Mar. 2006, pp. 18-20, vol. 39, Issue 3, IEEE Computer Society Press, Los Alamitos, CA, USA.
Trevor Pering, et al., "Spontaneous Marriages of Mobile Devices and Interactive Spaces", Communications of the ACM, Sep. 2005, pp. 53-59, vol. 48, Issue 9, ACM, New York, NY, USA. Michimune Kohno, et al., "TACT: Mobile Wireless Terminal for Digitally-Enabled Environments", ACM UbiComp2004, Sep. 2004, 2 pages.
Lauri Pohjanheimo, et al., "Implementing TouchMe Paradigm with a Mobile Phone", ACM International Conference Proceeding Series; Oct. 2005, pp. 87-92, vol. 121, ACM, New York, NY, USA.
Pasi Valkkynen, et al., "A User Interaction Paradigm for Physical Browsing and Near-object Control Based on Tags", Mobile HCI Conference 2003, Sep. 8, 2003, 4 pages.

* cited by examiner

*Primary Examiner* — Nick Corsaro
*Assistant Examiner* — Tangela T. Chambers

(57) ABSTRACT

Web compatible information is effortlessly exchanged over wireless communications utilizing web-based formats. These techniques can be employed over, for example, NFC air links and other wireless communication means to share information between devices in actual web exchangeable forms. The communication techniques allow lightweight communications to be automatically established between resource-constrained devices such as PDAs, cell phones, kiosks, movie posters, etc. Information can be passed and/or retrieved utilizing these techniques. These communication means can also be utilized to establish alternate types of communications by passing handshaking data between devices that can allow other communication protocols to be utilized.

20 Claims, 10 Drawing Sheets

WEB FORMAT-BASED WIRELESS COMMUNICATIONS

BACKGROUND

Wireless devices have become extremely common place. They enable users unrestricted movement while still maintaining communications through a variety of means. Some devices utilize long-range communications such as satellite or wireless telephone technologies. Others employ shorter range communications such as Bluetooth devices. Although shorter range communications may at first appear to be a disadvantage, they actually allow better discrimination between the sender and receiver. For example, Bluetooth devices can be limited to 30 to 60 foot areas of communication. This drastically reduces interference with other users. Unfortunately, Bluetooth technology requires 'discovery' by a device in order to find other Bluetooth sources. In meeting environments where there are many users, a Bluetooth discovery session may uncover multiple users and devices with very similar identification tags. This makes it hard for a user to discriminate as to which users or devices they would like to connect with.

Near field communications (NFC) have been developed to eliminate some of the inconveniences of current communication technologies while allowing fast, secure connections of devices in close proximity. The European Computer Manufacturer's Association (ECMA) has developed a standard for near field communications, NFCIP-1 (ECMA-340, ISO/IEC 18092) Near Field Communication Interface and Protocol. These standards will help guide manufacturers in developing NFC compatible devices. One of the main advantages of NFC is that two devices can automatically create a communication link when they are brought into close proximity of each other. This enables information to be quickly shared between the devices. For example, in meetings, business card information can be easily shared by bringing NFC devices next to each other. The proximity restrictions allow NFC devices to discriminate amongst other NFC devices to control the flow of information.

One of the disadvantages, however, of NFC is a tendency of manufacturers to lean towards developing new data exchange protocols just for emerging technologies. Creating new data formats and communication methods is costly and tends to isolate the new technology until a majority of the industry has adopted those methods. This inevitably leaves a few manufacturers who refuse to adopt and keep esoteric methods alive. Ultimately, the users pay the price for this discord with the manufacturers by having to learn how to coordinate NFC devices with different data exchange methodologies.

SUMMARY

Web formats are leveraged to provide web compatible information exchange over wireless communications. This allows existing web standards and/or languages to be employed over, for example, NFC air links and other wireless communication means to effortlessly share information between devices in actual web exchangeable forms. The communication techniques allow lightweight communications to be automatically established between resource-constrained devices such as PDAs, cell phones, kiosks, movie posters, etc. Information can be passed and/or retrieved utilizing these techniques. NFC tags, for example, can be read by users with an NFC compatible PDA by merely bringing the PDA in close proximity of the NFC tag. Likewise, for example, a movie poster can contain information that can be passed to a cell phone merely by bringing the cell phone close to a spot on the movie poster. These communication means can also be utilized to establish alternate types of communications by passing handshaking data between devices that can allow other communication protocols to be utilized. These techniques allow information to be passed seamlessly between devices and still remain compatible with web information structures and formats, substantially reducing technical costs and complexity for lightweight communications.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
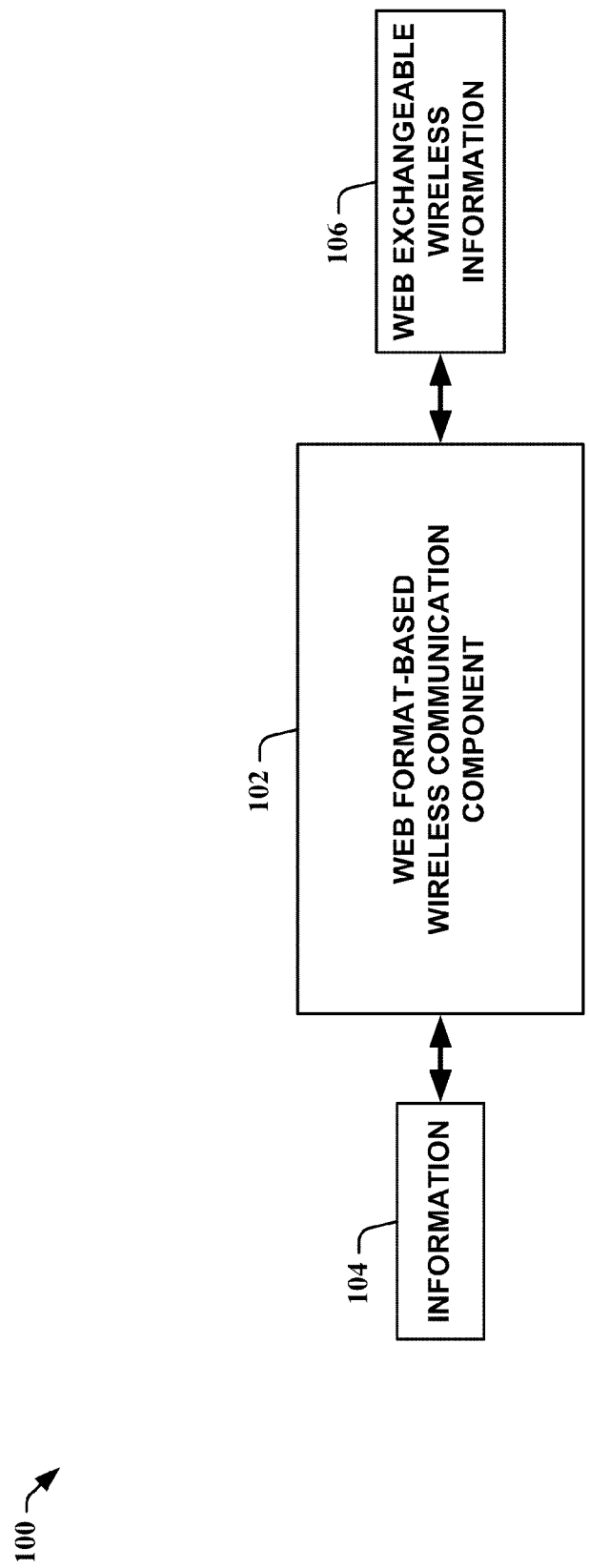
FIG. 1 is a block diagram of a web format-based wireless communication system in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

Wireless communications have become common place as society becomes more mobile. But each new wireless technology has required new standards and protocols to be established in order for particular devices to communicate. Instances disclosed herein provide techniques to leverage existing web formats over wireless technologies. This, in effect, extends the Web outside of its normal boundaries and into the physical world. Users are now able to "cut & paste" of sorts various types of information without being limited to desktop, laptops or other web connected devices. Mobile devices are now enabled to exchange information effortlessly without losing structural aspects of the information. Thus, for example, business cards can be electronically passed from one device to another while retaining its structure by merely passing one device near another.

A representation of a web format-based wireless communication system 100 is illustrated in FIG. 1. In this example, the web format-based wireless communication system 100 uses a single web format-based wireless communication component 102 to provide both send and receive aspects of communications. In other instances separate components can be utilized instead to provide these functions. The web format-based wireless communication component 102 receives/sends information 104 and sends/receives web exchangeable wireless information 106. When transmitting, the web format-based wireless communication component 102 accepts information 104 and utilizes web formats to encode and wirelessly transmit the information 104 as the web exchangeable wireless information 106. Likewise, when receiving the web exchangeable wireless information 106, the web format-based wireless communication component 102 provides information 104 by decoding the web exchangeable wireless information 106.

The information 104 can include, but is not limited to, information such as raw data, tables, charts, graphics, audio, games, communication protocols, and software applications and the like. Instances disclosed herein provide techniques for transporting data and do not impose restrictions on types of data that can be transported. Thus, for example, a user can approach a kiosk and easily transfer their business card to an electronic "fishbowl" of sorts or they can download a new ringtone from the kiosk just as easily. The web exchangeable wireless information 106 represents the information 104 after it has been processed for wireless transporting based on web formats. It can also include data transportation requirements necessary for various types of wireless communication means. Different techniques for processing the information 104 into the web exchangeable wireless information 106 are described in more detail infra. Because the web format-based wireless communication component 102 leverages web formats, new standards and protocols are not required for wireless communications, substantially reducing the overall implementation costs and complexities of wireless communication system installations.

For example, in one instance utilized for near field communications (NFC), a physical object (e.g., poster, kiosk, etc.) carries an NFC tag identified by a "communication enabled" indicator (e.g., symbol, etc.). A typical NFC tag contains RF and digital/analog circuitry, a memory array, an optional interface to external systems and an antenna to comply with the NFC communication standards. The "communication enabled" indicator serves to disclose the availability of content via an NFC air link and to serve as a touch mark for NFC devices. It typically is co-located with the tag antenna, but the tag chip itself and supporting electronics can be separated by some distance. A web format is then utilized to encapsulate information into an NFC Data Exchange Format (NDEF) wrapper. The web format-based wireless communication component 102 acts as an NFC enabled mobile device capable of operating in NFC reader/writer mode and communicating with the NFC tag or another NFC enabled device (e.g. a web kiosk, etc.). The web format-based wireless communication component 102 also functions to establish an NFC air link to the NFC tag or another NFC device and communicates in a standardized NFC fashion to provide/receive the web exchangeable wireless information 106.

Figure 2:
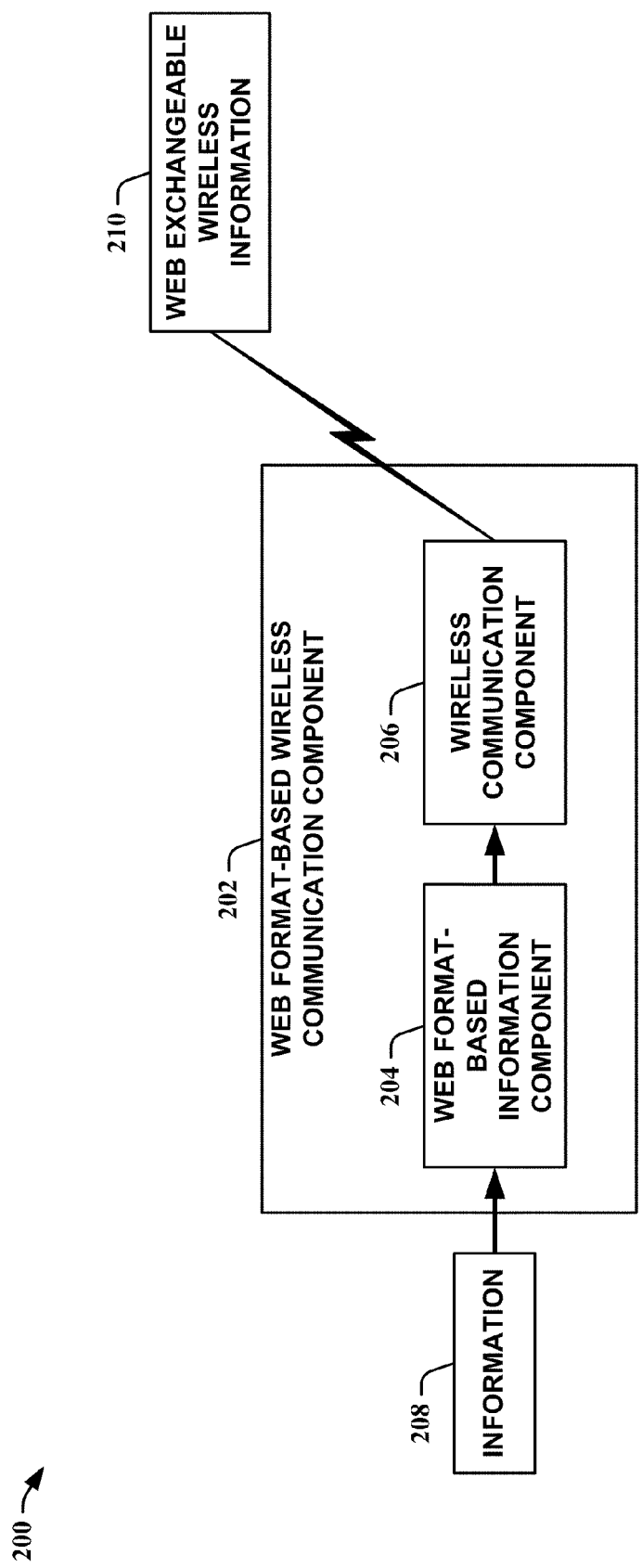
FIG. 2 is a block diagram of a transmitting web format-based wireless communication system in accordance with an aspect of an embodiment.

FIG. 2 shows an example of a transmitting web format-based wireless communication system 200 that utilizes a web format-based wireless communication component 202 to transform information 208 into web exchangeable wireless information 210. The web format-based wireless communication component 202 employs a web format-based information component 204 to receive the information 208 and process it utilizing web formats. The wireless communication component 206 receives the processed information 208 and transmits it as the web exchangeable wireless information 210. The web format-based information component 204 can employ various web formats to process the information 208 (discussed infra). Likewise, the wireless communication component 206 can employ various wireless communication means to transmit the web exchangeable wireless information 210. These communication means can include, for example, near field communication (NFC), Bluetooth, ultra-wideband (UWB), infrared (IrDA), and other wireless communications.

It can be appreciated that if the web format-based wireless communication system 200 is utilized in a passive manner such as, for example, as an electronic tag, the information 208 can be stored within the tag after it has been processed by the web format-based information component 204. This allows the wireless communication component 206, which can be passive and/or active, to transmit the processed information 208 directly from a data store without waiting for it to be processed. Passive electronic tags are generally energized by a receiving device which sends signals necessary to power the tag's transmitting circuitry. Thus, the techniques disclosed herein are applicable in passive tag devices, card emulation devices, and/or peer-to-peer devices and the like.

In one instance, the web format-based wireless communication component 202 can utilize, for example, an NFC communication means (described in detail infra) where the web format-based information component 204 can select and process data objects for transmission over an NFC air link. The web format-based information component 204 can then generate an NDEF package to encapsulate common data object microformats (discussed infra) typically utilized on web pages. This allows, for example, NFC enabled mobile devices to send information to, for example, posters and/or kiosks and the like.

Figure 3:
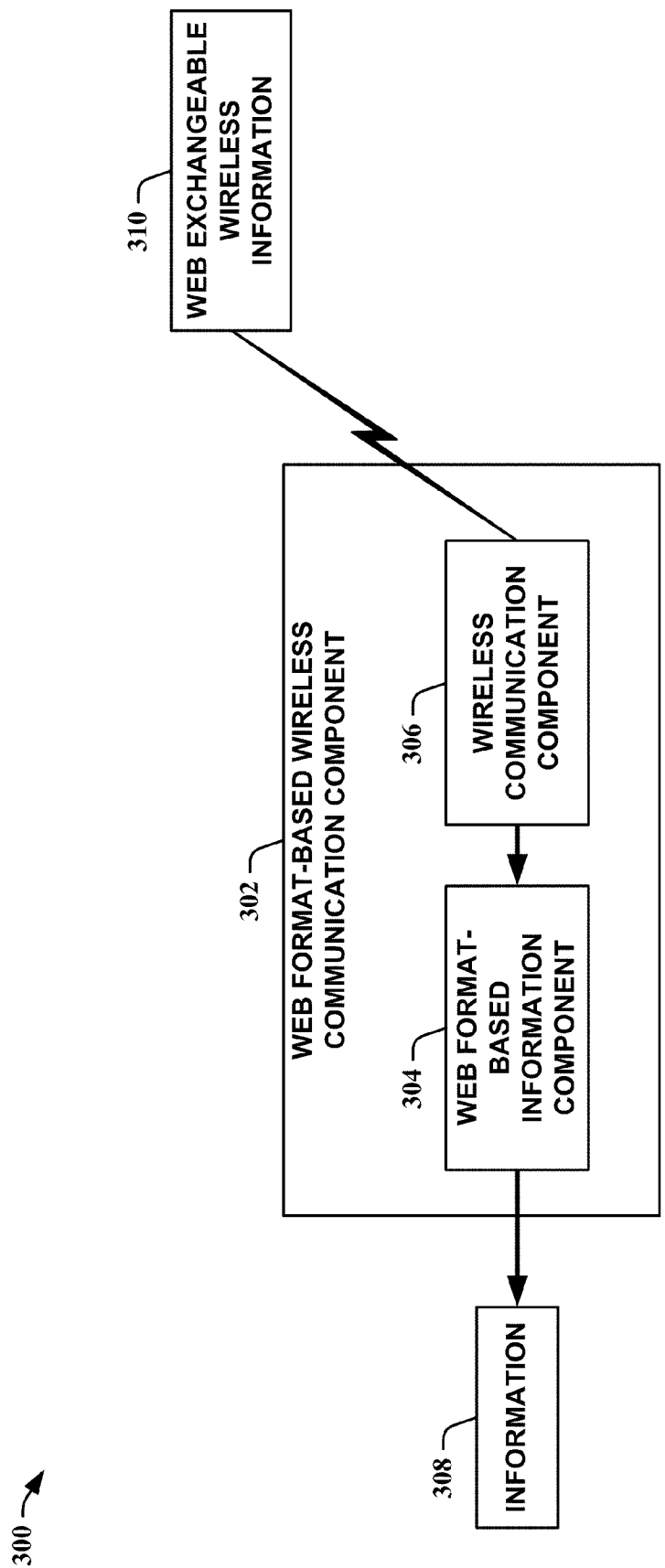
FIG. 3 is a block diagram of a receiving web format-based wireless communication system in accordance with an aspect of an embodiment.

Similarly in FIG. 3, a receiving web format-based wireless communication system 300 receives web exchangeable wireless information 310 via a wireless communication component 306 and provides information 308 by decoding it via a web format-based information component 304. As noted above, the wireless communication component 306 can also store the web exchangeable wireless information 310 'as is' locally and/or remotely without decoding it. This can be done so that the information can be passed back and forth between multiple devices and the like. Essentially, the web format-based wireless communication system 300 is acting as a reader of data. Thus, it could be used, for example, as the device that receives business cards at a kiosk fishing bowl and the like. Like the transmitting version described above, the web format-based wireless communication system 300 can employ various wireless communication means and web formats to perform its functions.

In one instance, the web format-based wireless communication component 302 can utilize, for example, an NFC communication means where the web format-based information component 304 parses an NDEF package and recognizes common data object microformats typically utilized on web pages. The web format-based information component 304 can also contain functions that can save, process, and/or display retrieved data objects. This allows, for example, NFC enabled mobile devices to read information from, for example, posters or kiosks and the like.

Figure 4:
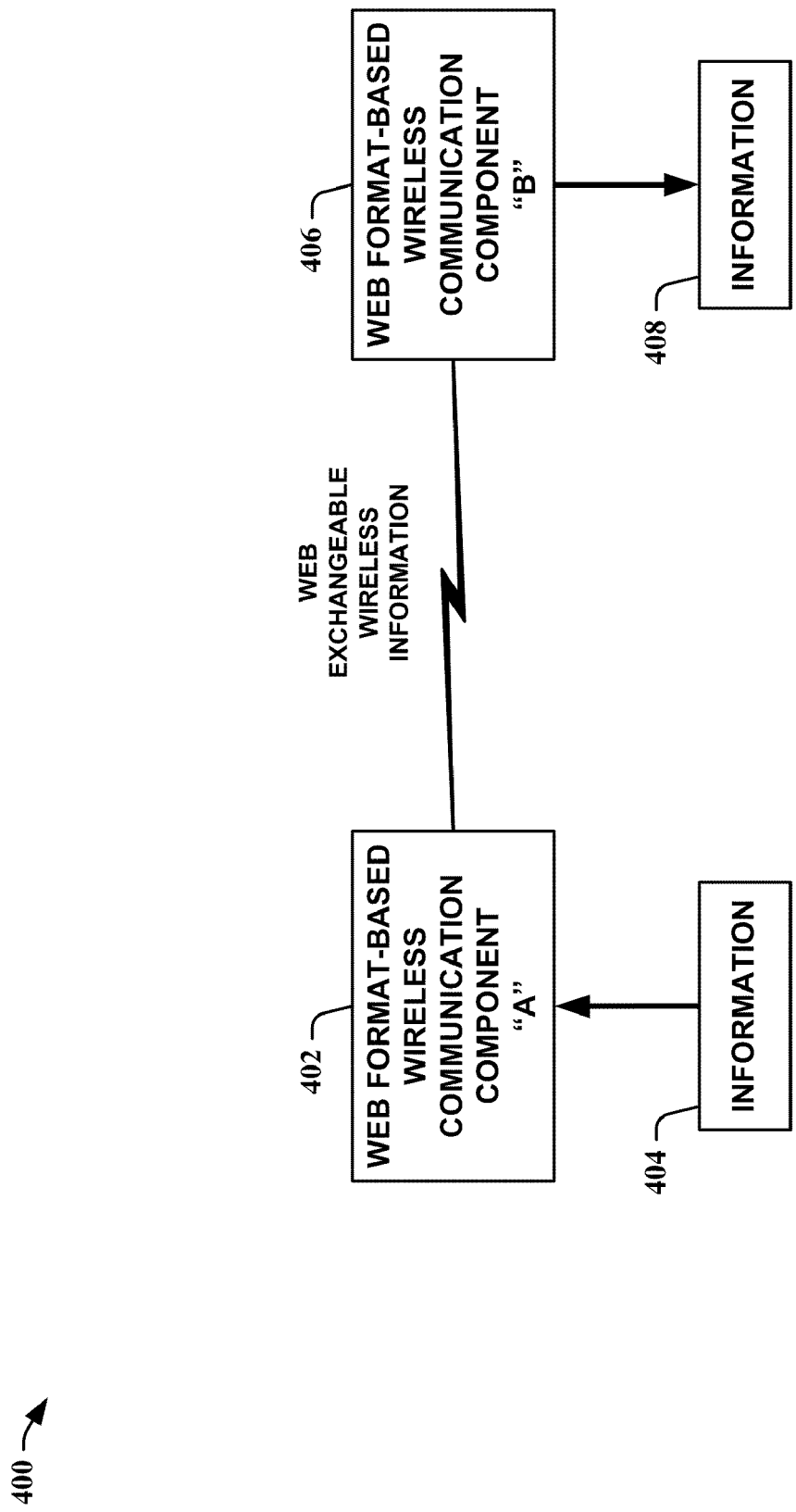
FIG. 4 is an illustration of an information exchange between web format-based wireless communication components in accordance with an aspect of an embodiment.

FIG. 4 demonstrates an information exchange 400 between web format-based wireless communication components 402, 406. In this example, web format-based wireless communication component "A" 402 is transmitting information 404 as web exchangeable wireless information to web format-based wireless communication component "B" 406. Web format-based wireless communication component "B" 406 then provides information 408. In one scenario, web format-based wireless communication component "A" 402 can reside in a mobile device while web format-based wireless communication component "B" 406 can reside within a stationary object and/or device. This would allow the mobile device to pass information to the stationary device when the devices came within a certain proximity established by a wireless communication means employed to transmit and receive the web exchangeable wireless information. This would be similar to the fishbowl at the kiosk example.

In another scenario, the web format-based wireless communication component "A" 402 can be in a stationary device and web format-based wireless communication component "B" 406 can be in a mobile device. For example, the stationary device can be a movie poster which provides movie dates and times along with character information whenever a qualified mobile device comes within a specified distanced. Thus, the mobile device represented by web format-based wireless communication component "B" 406 can energize the stationary device (if necessary) and receive the web exchangeable wireless information.

Each of the components 402, 406 can be active and/or passive components. Instances of the techniques disclosed herein do not discriminate between active and passive devices and operate efficiently with both types of devices and/or hybrid devices. Thus, these instances can be utilized with reader/writer, card emulation, and/or peer-to-peer communication systems and the like. As noted previously, informations 404, 408 can be stored in their web exchangeable forms to facilitate information exchange.

Figure 5:
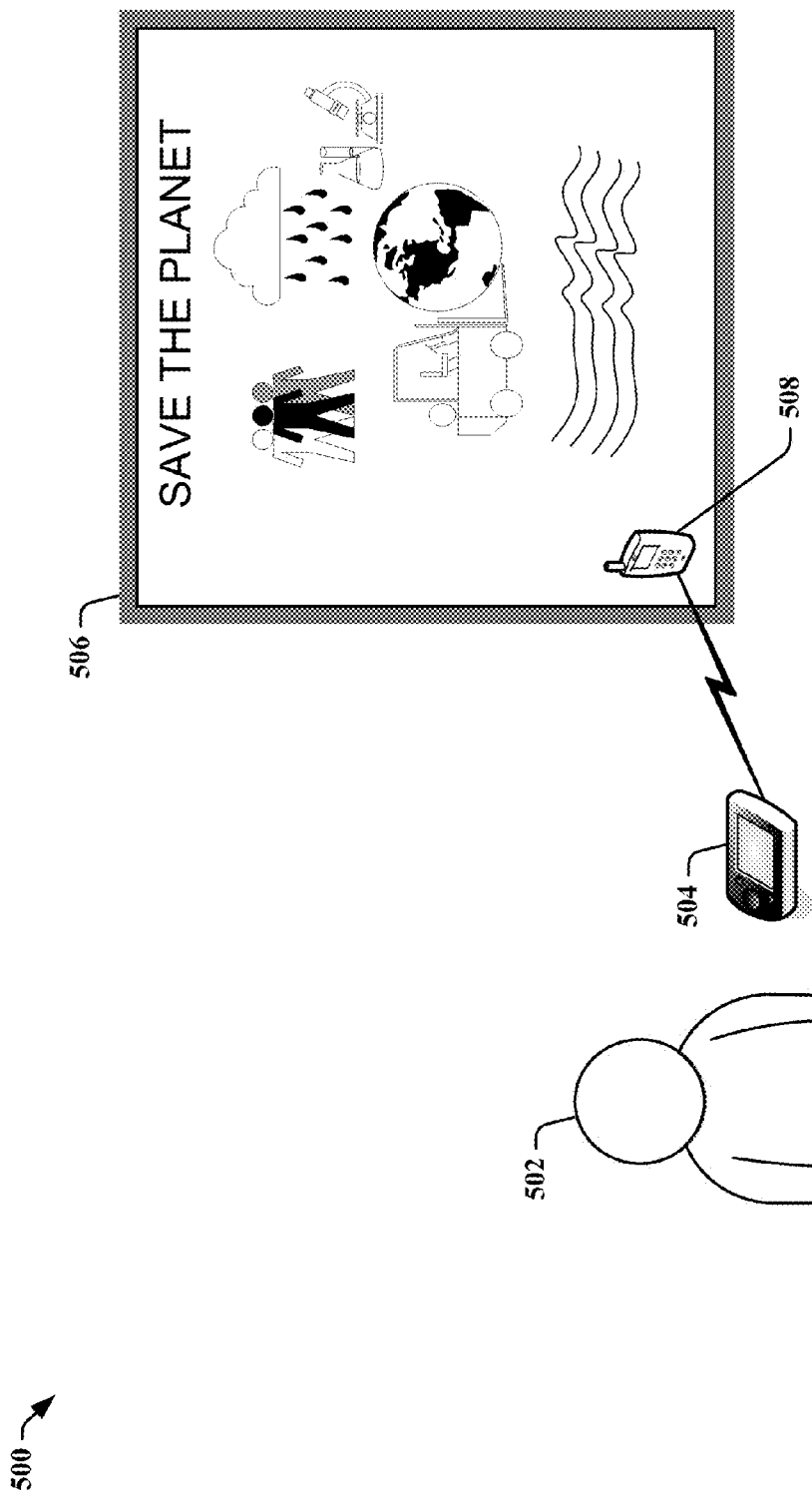
FIG. 5 is an illustration of an information exchange between a web format-based wireless communication system and a web format-based tag in a poster in accordance with an aspect of an embodiment.

FIG. 5 depicts an information exchange 500 between a web format-based wireless communication system 504 and a web format-based tag 508 in a poster 506. When a user 502 approaches the poster 506 with their mobile device containing the web format-based wireless communication system 504, it interacts with the poster 506 via the web format-based tag 508 to retrieve information (in this example). The web format-based tag 508 shown in FIG. 5 is strictly for illustrative purposes and is not meant to represent any physical likeness nor proposed trademark representation of the web format-based tag 508. Any symbol, sound, and/or other indicator can be utilized to train users to approach that spot to exchange web format-based information.

Instances disclosed herein are applicable to various types of wireless communication systems. One of the more recent wireless communication types is called near field communications or "NFC." NFC is a standards-based, short-range (a few centimeters) wireless connectivity technology that enables simple and safe two-way interactions among electronic devices. NFC devices can change their mode of operation to be in reader/writer, peer-to-peer, or card emulation mode. The different operating modes are based on the ISO/IEC 18092 NFCIP-1 and ISO/IEC 14443 contactless smart card standards. In reader/writer mode, the NFC device can read NFC tag types such as in the poster tag scenario above. The reader/writer mode is also RF interface compliant to the ISO 14443 and Sony Corporation's FeliCa (derived from ISO 18092, passive communication mode) schemes.

In peer-to-peer mode, devices can exchange data. For example, alternate communication means protocols can be exchanged such as for Bluetooth or WiFi link set up parameters and/or data such as virtual business cards or digital photos can be exchanged and the like. Peer-to-peer mode is standardized on ISO/IEC 18092 standards. In card emulation mode, a device can act as a tag, appearing to an external reader much the same as a traditional contactless smart card. A tag is typically a passive device that stores data read by an NFC-enabled device. This allows, for example, contactless payments and ticketing and the like.

A commonly anticipated use is to place NFC tags onto outdoor advertising (e.g., movie posters, vending machines, bus shelters, etc.). The user of an NFC-enabled mobile device, such as a mobile phone or PDA, can place their device near the tag on the poster and information related to the advertiser and their promotion can be transferred to the mobile device for future use and reference. It is anticipated that phone numbers, venue address, maps, calendar event records, visual and textual information, and other data types could be transferred. However, NFC has many problems that will hamper its everyday use. One of the primary problems is how to exchange data types the user is interested in and familiar with over an NFC data link.

One instance provided herein employs a bi-directional, asynchronous replication process among loosely cooperating applications (i.e., devices) to transfer information over an NFC compliant air link (for example, Microsoft's Simple Sharing Extensions (SSE) and the like). This technique is based on a web formatted wrapping of content that allows transferring of data (for example, UserLand's Really Simple Syndication RSS 2.0 and the like). SSE is a standard that supports the use of RSS 2.0 as the basis for item sharing and provides a bi-directional, asynchronous replication of new and changed items among two or more cross-subscribed RSS feeds.

Thus, instances provided herein can utilize this type of web format based SSE and SSE like schema to exchange information wirelessly over, for example, NFC air links. Essentially, the cross-subscribed feeds are replaced with the NFC air link between two loosely cooperating applications (the NFC enabled devices). Information can then be pasted back and forth utilizing two completely different endpoints (other than web components). For example, one endpoint can be a mobile device with an NFC link and the other can be a fixed poster or kiosk and the like with an NFC link. Thus, the two loosely cooperating applications are running on the mobile device and the fixed poster or kiosk rather than on a web server, essentially replacing web services and without the burdens of HTTP.

Other web formats that are utilized to preserve the structure of web information can be employed as well. Just as users of desktop PCs can cut and paste among their applications, web users will have similar capabilities within web browsers. Instances can also utilize this web format of cut & paste processes to facilitate the transfer of information while preserving its structure over wireless communications. Essentially, a cut process can be employed to store data with its original structure intact in, for example, a tag (i.e., a stationary web format-based wireless communication device) until, for example, a mobile device (i.e., a mobile web format-based wireless communication device) comes within a certain distance. At that time, a paste can be performed from the tag to the mobile device.

In order to preserve the structure of the information, various types of web formats can be utilized. For example, a set of micro-formats can be employed that represent semantic content for common data types (e.g., business card format like vCard, calendar event format iCalendar, etc.), but wrapped in XHTML-compliant XML and suitable for stylistic markup, layout, and display using a common web browser. Microformats are essentially XML representations of common data objects (e.g., hCard, hCalendar, etc.). What makes microformats especially useful is their textual representation as semantic markup using XML. In this form, even if the true semantic meaning of the data object is not supported directly by domain-specific applications, the data can be laid out, styled, and presented using any common web browser. This is not possible using the underlying binary formats from which microformats are derived. For example, a vCard is not intended for direct human interpretation—vCard requires application support to interpret. hCard, derived from vCard, by contrast, is human-readable XML and can be styled and presented in a web browser even if no domain-specific application is available to process it directly.

It is possible to layer HTTP, the Hyper Text Transfer Protocol used by web browsers, onto the NFC protocol stack, above the link layer. In doing this, a web browser can access physical assets such as outside advertising, bus shelters, movie posters in a theater lobby, or information kiosks and the like. But this solution (including TCP/IP, DHCP, and lower stack layers) is over-weight if one wishes simply to exchange data directly across an NFC air link. Further, using HTTP requires active communication by both endpoints. An NFC tag is passive, that is, it is incapable of communicating actively at high-levels of abstraction. Its primary function is to provide data in response to a rather simple RF command and response protocol.

Thus, for example, SSE applied to RSS 2.0 formatted syndicated content can be directly encapsulated into an NDEF (NFC Data Exchange Format) message and placed into an NFC "tag" which is then applied to a poster, building, kiosk, and/or other physical object and the like. By applying web cut & paste techniques that preserve information structure to, for example, a tag in a physical poster, users of NFC-enabled mobile devices can use a "touch gesture" to exchange information with the physical world in the same way they can interact with a web page using a browser. But they "touch" with a device, rather than "click" with a mouse. In this context, touch refers to coming within a certain proximity rather than requiring actual contact. In another example, by attaching a tag with appropriate interface electronics and software to, for example, a web kiosk, a hybrid paradigm is also possible—display a web page on the kiosk; then touch the NFC-enabled mobile device to the "touch mark" on the kiosk enclosure to exchange context-relevant and tailored data between device and kiosk application. The notion of "downloading" or "exchanging" data objects from/with posters or web kiosks identified by the same iconography and structured according to the same data formatting conventions used on web pages, narrows the education gap, reduces user frustration, and extends the reach of existing back-end systems.

NFC communications can utilize several different formats to exchange data. Instances disclosed herein can utilize, for example, SSE markup exchanged over NFCIP-1 standard, SSE markup exchanged over an NFC Data Link Control Protocol, and/or SSE markup encapsulated in an NFC Data Exchange Format message assembly and the like. The transfer of HTML/XHTML/CSS/ECMAScript, object exchange (OBEX), and/or common data object microformats and the like can also be accomplished over an NFC link using NFC Data Exchange Format message assembly to facilitate the preservation of the information structure. It can be appreciated that SSE is not the only web format that can be utilized for transferring information over the above NFC formats.

In view of the exemplary systems shown and described above, methodologies that may be implemented in accordance with the embodiments will be better appreciated with reference to the flow charts of FIGS. 6-9. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

Figure 6:
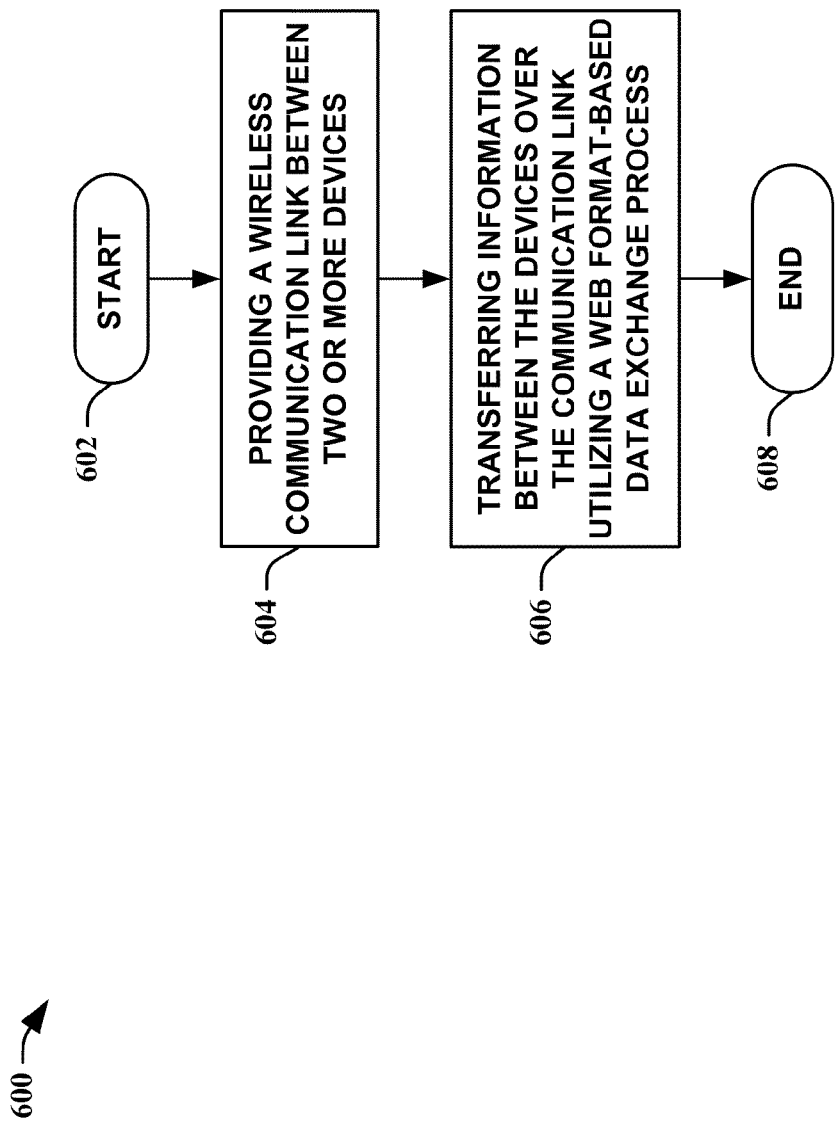
FIG. 6 is a flow diagram of a method of web format-based information exchange in accordance with an aspect of an embodiment.

In FIG. 6, a flow diagram of a method 600 of web format-based information exchange in accordance with an aspect of an embodiment is illustrated. The method 600 starts 602 by providing a wireless communication link between two or more devices 604. Various wireless communication means can be utilized to establish the link. These communication means can include, for example, near field communication (NFC), Bluetooth, ultra-wideband (UWB), infrared (IrDA), and other wireless communications. Information is then transferred between the devices over the communication link utilizing a web format-based data exchange process 606, ending the flow 608. The web format-based data exchange process can include, but is not limited to, utilizing an NDEF package that encapsulates common data object microformats typically utilized on web pages. The web formats facilitate in preserving the information structure during the transporting of the information over the wireless communication link. Additional processes are described supra.

Figure 7:
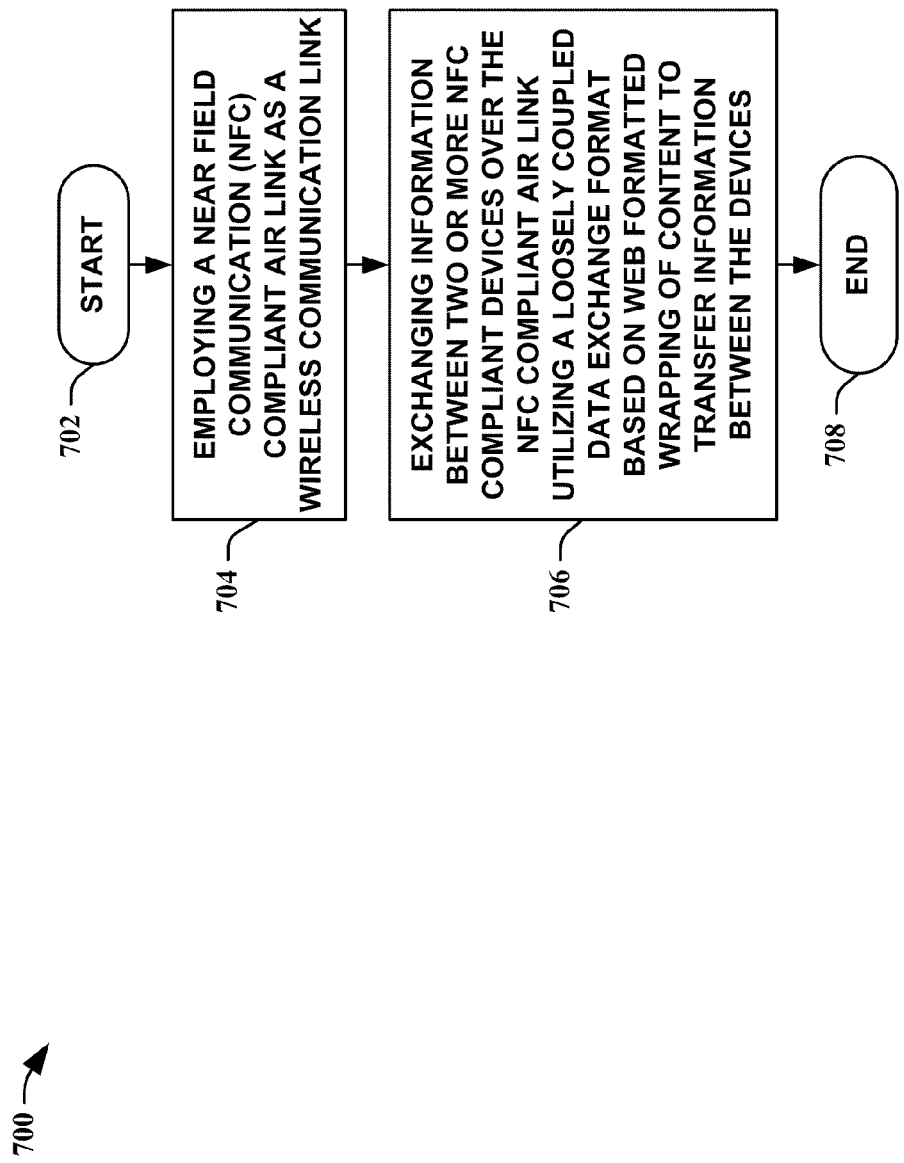
FIG. 7 is a flow diagram of a method of web format-based information exchange over an NFC compliant air link in accordance with an aspect of an embodiment.

Turning to FIG. 7, a flow diagram of a method 700 of web format-based information exchange over an NFC compliant air link in accordance with an aspect of an embodiment is shown. The method 700 starts 702 by employing a near field communication (NFC) compliant air link as a wireless communication link 704. Information is then exchanged between two or more NFC compliant devices over the NFC compliant air link utilizing a loosely coupled data exchange format based on web formatted wrapping of content to transfer information between the devices 706, ending the flow 708. For example, SSE (based on RSS 2.0) can be employed to transfer the information over the NFC compliant air link. This allows the NFC compliant devices to act as loosely coupled applications that accept content wrapped in XML.

Figure 8:
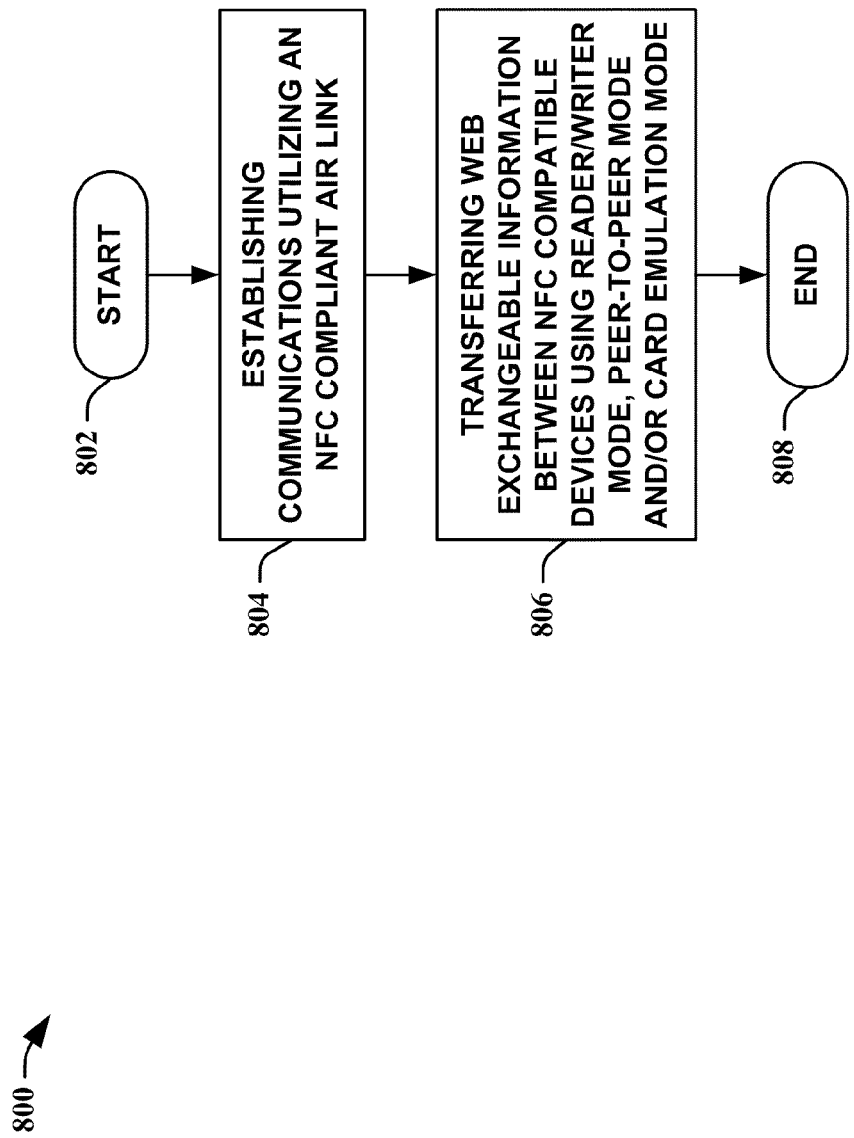
FIG. 8 is a flow diagram of a method of web format-based information exchange over an NFC compliant air link utilizing various modes in accordance with an aspect of an embodiment.

Looking at FIG. 8, a flow diagram of a method 800 of web format-based information exchange over an NFC compliant air link utilizing various modes in accordance with an aspect of an embodiment is depicted. The method 800 starts 802 by establishing communications utilizing an NFC compatible air link 804. Web exchangeable information is then transferred between NFC compatible devices using reader/writer mode, peer-to-peer mode and/or card emulation mode 806, ending the flow 808. Instances provided herein can be utilized with any of the NFC capable modes. The exchange of web formatted information is not limited by the type of send/receive and/or active/passive nature of the NFC enabled devices.

Figure 9:
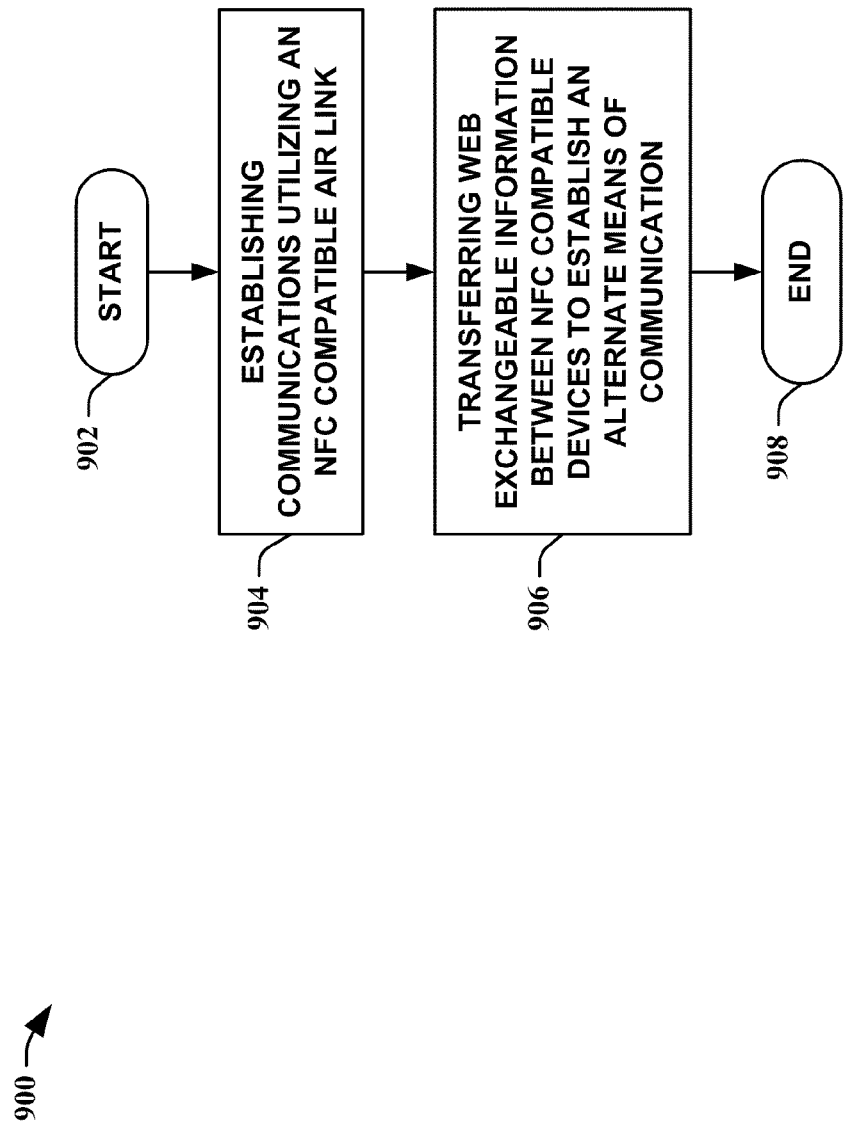
FIG. 9 is a flow diagram of a method of web format-based information exchange to establish an alternate means of communication in accordance with an aspect of an embodiment.

Referring to FIG. 9, a flow diagram of a method 900 of web format-based information exchange to establish an alternate means of communication in accordance with an aspect of an embodiment is illustrated. The method 900 starts 902 by establishing communications utilizing an NFC compatible air link 904. Web exchangeable information is then transferred between NFC compatible devices to establish an alternate means of communication 906, ending the flow 908. The types of information passed can include, but are not limited to, information such as raw data, tables, charts, graphics, audio, games, communication protocols, and software applications and the like. Instances disclosed herein provide techniques for transporting data and do not impose restrictions on types of data that can be transported. Thus, for example, it can also include data protocol requirements necessary for establishing various types of wireless communication means besides NFC. This allows, for example, a user to "touch" other NFC enabled devices and effortlessly establish, for example, a Bluetooth connection. This is substantially easier to do than using the Bluetooth's "find" feature and sorting through a list of potential links before determining which one is correct.

Figure 10:
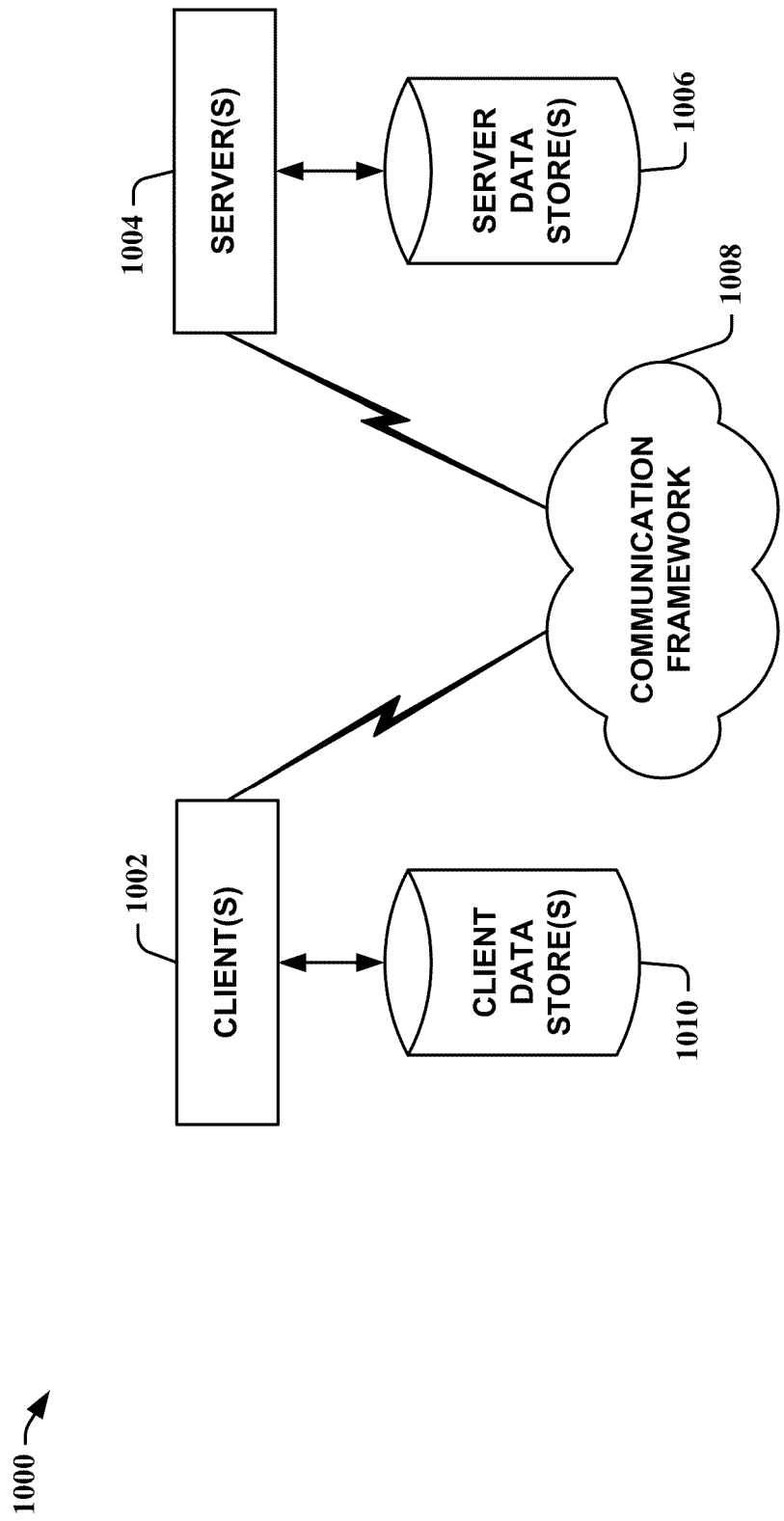
FIG. 10 illustrates an example system in which an embodiment can interact.

FIG. 10 is a block diagram of a sample system 1000 in which embodiments can interact. The system 1000 is representative of a typical web-based system that shares information over the Internet. The instances provided herein can interact with such a system utilizing web format based information structures. The system 1000 includes one or more client(s) 1002. The client(s) 1002 can be hardware and/or software (e.g., threads, processes, computing devices). The system 1000 also includes one or more server(s) 1004. The server(s) 1004 can also be hardware and/or software (e.g., threads, processes, computing devices). One possible communication between a client 1002 and a server 1004 can be in the form of a data packet adapted to be transmitted between two or more computer processes. The system 1000 includes a communication framework 1008 that can be employed to facilitate communications between the client(s) 1002 and the server(s) 1004. The client(s) 1002 are connected to one or more client data store(s) 1010 that can be employed to store information local to the client(s) 1002. Similarly, the server(s) 1004 are connected to one or more server data store(s) 1006 that can be employed to store information local to the server(s) 1004.

It is to be appreciated that the systems and/or methods of the embodiments can be utilized in web exchangeable wireless communications facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for transferring information over wireless communications, comprising acts of:
   providing a wireless communication link between two or more resource-constrained devices;
   encapsulating supported and unsupported data objects in wireless messages for object sharing using a web exchangeable microformat based on web feeds, wherein the data objects comprise information selected from at least one of raw data, tables, charts, graphics, audio, games, communication protocols, or software applications;
   transferring the wireless messages in the web exchangeable format between the resource-constrained devices over the communication link utilizing a web format-based data exchange process;
   decoding the wireless messages in the web exchangeable microformat, transferred from a respective resource-constrained device, back into the data objects; and
   utilizing a processor to execute instructions stored in memory to perform at least one of the acts of providing, encapsulating, transferring or decoding.

2. The method of claim 1 further comprising:
   employing web-compatible languages, scripts, and/or common data object microformats to preserve a structure of the wireless messages while transferring the wireless messages over a near field communication (NFC) link utilizing NFC data exchange format message assembly.

3. The method of claim 1 further comprising:
   employing a near field communication (NFC) compliant air link as the wireless communication link; and
   exchanging information between two or more NFC compliant devices and/or an electronic tag over the NFC compliant air link utilizing a web-based format.

4. The method of claim 3 further comprising:
utilizing a loosely coupled data exchange format based on web formatted wrapping of content to transfer information between the devices.

5. The method of claim 4 further comprising:
employing a bi-directional, asynchronous replication process among multiple loosely cooperating devices to transfer information over the NFC compliant air link.

6. The method of claim 5 further comprising:
employing NFC data link control protocol to transfer the wireless messages over the NFC compliant air link.

7. The method of claim 5 further comprising:
transferring the wireless messages encapsulated in an NFC data exchange format message assembly over the NFC compliant air link.

8. The method of claim 5 further comprising:
transferring the wireless messages utilizing an object exchange (OBEX) format over the NFC compliant air link.

9. The method of claim 3 further comprising:
maintaining at least one structural aspect of a wireless message transferred between the devices.

10. The method of claim 9 further comprising:
utilizing extensible markup language (XML) schema and/or microformat schema to preserve structured data during transfer.

11. The method of claim 3 further comprising:
transferring initialization information in a wireless message for establishing an alternative communication link protocol.

12. The method of claim 3 further comprising:
operating at least one device in reader/writer mode, peer-to-peer mode, and/or card emulation mode.

13. A device employing the method of claim 1 comprising at least one selected from the group consisting of a computer, a server, an electronic tag, and a handheld electronic device.

14. A system that transfers data over wireless communications, comprising:
a resource-constrained wireless communication component that can receive and/or transmit information wirelessly;
a web format-based information component that encapsulates information having a predetermined format into an outgoing wireless message in web exchangeable microformats and provides the encapsulated information to the resource-constrained wireless communication component for transmission to a wireless device and decodes an incoming wireless message in web exchangeable microformats received from the resource-constrained wireless communication component into information having the predetermined format, wherein the information comprises at least one of raw data, tables, charts, graphics, audio, games, communication protocols, or software applications; and
a processor that executes computer-executable instructions associated with at least one of the wireless communication component or the web format-based information component.

15. The system of claim 14, the web format-based information component preserves a web exchangeable data structure of the information when received and/or transmitted.

16. The system of claim 14, the wireless communication component is a passive and/or an active component.

17. The system of claim 14 employed in an electronic tag device, in a reader/writer system, in a card emulation system, and/or in peer-to-peer communications.

18. The system of claim 14, the wireless communication component communicates utilizing infrared data association (IrDA), ultra wideband (UWB), and/or Bluetooth compatible standards.

19. The system of claim 14, the wireless communication component employs an NFC air link to transmit and/or receive information.

20. A system that facilitates wireless communications, comprising:
means for providing wireless communications between resource-constrained devices;
means for encapsulating supported and unsupported data objects in wireless messages for object sharing using a web understandable microformat based on web feeds, wherein the data objects comprise information selected from at least one of raw data, tables, charts, graphics, audio, games, communication protocols, or software applications;
means for exchanging the wireless messages between the resource-constrained devices over the wireless communications utilizing the web understandable microformat;
means for decoding the wireless messages in the web understandable microformat, exchanged between respective resource-constrained devices, into information having a predetermined format; and
processor means that executes computer-executable instructions associated with at least one of the means for providing, encapsulating, exchanging or decoding.

* * * * *